US010450664B1

United States Patent
Mraied et al.

(10) Patent No.: US 10,450,664 B1
(45) Date of Patent: Oct. 22, 2019

(54) ELECTRODEPOSITION OF METAL MICROSTRUCTURES

(71) Applicants: Hesham Y. Saleh Mraied, Tampa, FL (US); Wenjun Cai, Tampa, FL (US)

(72) Inventors: Hesham Y. Saleh Mraied, Tampa, FL (US); Wenjun Cai, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 15/990,888

(22) Filed: May 29, 2018

Related U.S. Application Data

(62) Division of application No. 14/935,398, filed on Nov. 7, 2015, now Pat. No. 10,006,134.

(60) Provisional application No. 62/076,591, filed on Nov. 7, 2014.

(51) Int. Cl.
| | | |
|---|---|---|
| *C25D 1/02* | (2006.01) | |
| *C25D 1/00* | (2006.01) | |
| *C25D 3/56* | (2006.01) | |
| *B32B 15/01* | (2006.01) | |

(52) U.S. Cl.
CPC ............ *C25D 1/003* (2013.01); *B32B 15/016* (2013.01); *C25D 1/02* (2013.01); *C25D 3/56* (2013.01)

(58) Field of Classification Search
None
See application file for complete search history.

(56) References Cited

U.S. PATENT DOCUMENTS

2014/0170303 A1* 6/2014 Rayner ................... C25D 1/00
427/58

OTHER PUBLICATIONS

Fleck, N.A., V.S. Deshpande, and M.F. Ashby, Micro-architectured materials: past, present and future. P Roy Soc a-Math Phy, 2010. 466(2121): p. 2495-2516.
Kolodziejska, J.A, C.S. Roper, S.S. Yang, W.B. Carter, and A.J. Jacobsen, Research Update: Enabling ultra-thin lightweight structures: Microsandwich structures with microlattice cores. Apl Mater, 2015. 3(5).
Xiong, J., R. Mines, R. Ghosh, A. Vaziri, L. Ma, A. Ohrndorf, H. Christ, and L. Wu, Advanced Micro-Lattice Materials. Advanced Engineering Materials, 2015: p. 1-12.
Tian, J., T. Kim, T.J. Lu, H.P. Hodson, D.T. Queheillalt, D.J. Sypeck, and H.N.G. Wadley, The effects of topology upon fluid-flow and heat-transfer within cellular copper structures. Int J Heat Mass Tran, 2004. 47(14-16): p. 3171-3186.
Lu, T.J., L. Valdevit, and A.G. Evans, Active cooling by metallic sandwich structures with periodic cores. Prog Mater Sci, 2005. 50(7): p. 789-815.
Roper, C.S., Multiobjective optimization for design of multifunctional sandwich panel heat pipes with micro-architected truss cores. Int J Heat Fluid Fl, 2011. 32(1): p. 239-248.
Gu, et al., "Ultra-strong architected Cu meso-lattices", Extreme Mechanics letters; ScienceDirect 2, 2015.

(Continued)

*Primary Examiner* — John J Figueroa
(74) *Attorney, Agent, or Firm* — Thomas | Horstemeyer, LLP

(57) ABSTRACT

In one embodiment, an alloy microstructure structure includes a bottom plate made of an aluminum alloy, and a plurality of elongated pillars that extend from the bottom plate, the pillars being made of the aluminum alloy and having lengths no greater than 10 centimeters.

12 Claims, 9 Drawing Sheets

(56) References Cited

OTHER PUBLICATIONS

McCormack, T.M., R. Miller, O. Kesler, and L.J. Gibson, Failure of sandwich beams with metallic foam cores. Int J Solids Struct, 2001. 38(28-29): p. 4901-4920.

Shen, Y., S. McKown, S. Tsopanos, C.J. Sutcliffe, R.A.W. Mines, and W.J. Cantwell, The Mechanical Properties of Sandwich Structures Based on Metal Lattice Architectures. J Sandw Struct Mater, 2010. 12(2): p. 159-180.

Wadley, H.N.G., N.A. Fleck, and A.G. Evans, Fabrication and structural performance of periodic cellular metal sandwich structures. Compos Sci Technol, 2003. 63(16): p. 2331-2343.

Yin, S., L.Z. Wu, L. Ma, and S. Nutt, Hybrid truss concepts for carbon fiber composite pyramidal lattice structures. Compos Part B-Eng, 2012. 43(4): p. 1749-1755.

Meza, L.R., S. Das, and J.R. Greer, Strong, lightweight, and recoverable three-dimensional ceramic nanolattices. Science, 2014. 345(6202): p. 1322-1326.

Ruan, S.Y. and C.A. Schuh, Electrodeposited Al—Mn alloys with microcrystalline, nanocrystalline, amorphous and nano-quasicrystalline structures. Acta Mater, 2009. 57(13): p. 3810-3822.

Ruan, S.Y. and C.A. Schuh, Towards electroformed nanostructured aluminum alloys with high strength and ductility. J Mater Res, 2012. 27(12): p. 1638-1651.

Olson, J., A. Manjavacas, L. Liu, W. Chang, B. Foerster, N.S. King, M.W. Knight, P. Nordlander, N.J. Halas, and S. Link, Vivid, full-color aluminum plasmonic pixels. P Natl Acad Sci USA, 2014. 111(40): p. 14348-14353.

Cheah, S.K., E. Perre, M. Rooth, M. Fondell, A. Harsta, L. Nyholm, M. Boman, T. Gustafsson, J. Lu, P. Simon, and K. Edstrom, Self-Supported Three-Dimensional Nanoelectrodes for Microbattery Applications. Nano Lett, 2009. 9(9): p. 3230-3233.

Oltean, G., L. Nyholm, and K. Edstrom, Galvanostatic electrodeposition of aluminium nano-rods for Li-ion three-dimensional microbattery current collectors. Electrochim Acta, 2011. 56(9): p. 3203-3208.

Deshpande, V.S. and N.A. Fleck, High strain rate compressive behaviour of aluminium alloy foams. Int J Impact Eng, 2000. 24(3): p. 277-298.

Mukai, T., H. Kanahashi, T. Miyoshi, M. Mabuchi, T.G. Nieh, and K. Higashi, Experimental study of energy absorption in a close-celled aluminum foam under dynamic loading. Scripta Mater, 1999. 40(8): p. 921-927.

Verdieck, R.G. and L.F. Yntema, The electrochemistry of baths of fused aluminum halides I Aluminum as a reference electrode. J Phys Chem-Us, 1942. 46(3): p. 344-352.

Tsuda, T., C.L. Hussey, and G.R. Stafford, Electrodeposition of Al—Mo—Mn ternary alloys from the Lewis acidic AlCl3—EtMelmCl molten salt. J Electrochem Soc, 2005. 152(9): p. C620-C625.

Su, C J., Y.T. Hsieh, C.C. Chen, and I.W. Sun, Electrodeposition of aluminum wires from the Lewis acidic AlCl3/trimethylamine hydrochloride ionic liquid without using a template. Electrochem Commun, 2013. 34: p. 170-173.

Uchida, J., T. Tsuda, Y. Yamamoto, H. Seto, M. Abe, and A. Shibuya, Electroplating of Amorphous Aluminum Manganese Alloy from Molten-Salts. Isij Int, 1993. 33(9): p. 1029-1036.

Stafford, G.R. and C.L. Hussey, Electrodeposition of Transition Metal-Aluminum Alloys from Chloroaluminate Molten Salts, in Advances in Electrochemical Science and Engineering. 2001, Wiley-VCH Verlag GmbH: Weinheim. p. 313-328.

Boon, J.A., J.A. Levisky, J.L. Pflug, and J.S. Wilkes, Friedel Crafts Reactions in Ambient-Temperature Molten-Salts. J Org Chem, 1986. 51(4): p. 480-483.

Li Q.F., H.A. Hjuler, R.W. Berg, and N.J. Bjerrum, Electrochemical Deposition and Dissolution of Aluminum in Naalcl4 Melts—Influence of Mncl2 and Sulfide Addition. J Electrochem Soc, 1990. 137(9): p. 2794-2798.

Huo, S. and W. Schwarzacher, Anomalous scaling of the surface width during Cu electrodeposition. Phys Rev Lett, 2001. 86(2): p. 256-259.

Dammers, A.J. and S. Radelaar, 2-Dimensional Computer Modeling of Polycrystalline Film Growth. Texture Microstruct, 1991. 14: p. 757-762.

Liu, X.J., I. Ohnuma, R. Kainuma, and K. Ishida, Thermodynamic assessment of the aluminum-manganese (Al—Mn) binary phase diagram. J Phase Equilib, 1999.20(1): p. 45-56.

Tian, M.L., J.U. Wang, J. Kurtz, T.E. Mallouk, and M.H.W. Chan, Electrochemical growth of single-crystal metal nanowires via a two-dimensional nucleation and growth mechanism. Nano Lett, 2003. 3(7): p. 919-923.

Oliver, W.C. and G.M. Pharr, An improved technique for determining hardness and elastic modulus using load and displacement sensing indentation experiments. Journal of Materials Research, 1992. 7(06): p. 1564-1583.

Kolodziejska, et al. "Research Update: Enabling ultra-think lightweight structures: Microsandwich structures with microlattice cores", AIP Materials. AIP Publishing, 2015.

Shuaeib, F.M. and P.D. Soden, Indentation failure of composite sandwich beams. Compos Sci Technol, 1997. 57(9-10): p. 1249-1259.

Lewandowski, J.J., W.H. Wang, and A.L. Greer, Intrinsic plasticity or brittleness of metallic glasses. Phil Mag Lett, 2005. 85(2): p. 77-87.

* cited by examiner

ELECTRODEPOSITION OF METAL MICROSTRUCTURES

CROSS-REFERENCE TO RELATED APPLICATION

This application is a divisional application of U.S. Non-Provisional Application entitled "Electrodeposition Of Metal Microstructures," having Ser. No. 14/935,398 and filed Nov. 7, 2015, and claims priority to U.S. Provisional Application Ser. No. 62/076,591, filed Nov. 7, 2014, both of which are hereby incorporated by reference herein in their entireties.

BACKGROUND

Micro-architectured structures, or "microstructures," including microlattices and microsandwiches, have recently emerged as promising structural and functional frameworks for small-scale multi-functional devices. The open architecture of such structures not only leads to low areal density and high damage tolerance, but also provides channels for heat and fluid flow, which are critical to multi-functional devices, such as high capacity batteries, insect-like robots, and micro-air vehicles.

Sandwich structures, which comprise a core that extends between opposed end plates, exhibit higher bending rigidity than lattices by effectively redistributing the mass to the outer surfaces (instead of the core), similar to natural cellular materials found in insects and plants. Such superior properties have led to extensive studies on the structural performance of sandwich structures, mostly with physical dimensions above tens of centimeters. The damage tolerance of sandwich structures is highly dependent on the density, strength, and geometry of the core. It was found that a periodic sandwich core can be optimized to sustain loads at much lower relative densities than stochastic foams. Further improvement of mechanical properties may also be achieved by hybridizing the core material.

Existing fabrication procedures for large-scale sandwich structures typically involve welding or adhesive bonding of the face sheets and the core. These techniques become challenging as the size of the sandwich's core decreases to the nano- or micro-scale. Recently there have been several successful attempts to create microlattice and microsandwich structures from polymers, ceramics, and metals. Unfortunately, the fabrication processes used to construct these microstructures are complicated or limited to specific materials. It can therefore be appreciated that it would be desirable to have a more simple fabrication technique for such microstructures.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have a simple fabrication technique for microstructures. Disclosed herein are example methods for fabricating microstructures, such as microsandwich structures. In some embodiments, a non-conductive polymer membrane comprising a plurality of elongated pores formed therein is coated with a conductive material, such as a metal, and a metal alloy, such as an aluminum (Al) alloy, is electrodeposited on the conductive material at room temperature in an ionic liquid electrolyte under galvanostatic control. In some embodiments, the composition (i.e., microstructure) of the alloy can be altered by changing the concentration of the alloyed metal present within the electrolyte.

In the following disclosure, various specific embodiments are described. It is to be understood that those embodiments are example implementations of the disclosed inventions and that alternative embodiments are possible. All such embodiments are intended to fall within the scope of this disclosure.

Disclosed in the following disclosure are methods for fabricating crystalline and amorphous alloy microstructures, such as microtube and microsandwich structures, using template electrodeposition. In some embodiments, the alloy comprises an alloy of Al and a transition metal that increases the strength of the metal. By way of example, the alloy can comprise an Al-manganese (Mn) alloy. The microstructures can be fabricated using a one-step electrodeposition process using a room temperature ionic liquid. The disclosed methods offer an opportunity to create Al alloy microstructures with low density, open architecture, and high specific strength and damage tolerance. Such microstructures can, for example, be used in applications as plasmonic pixels in color displays, anodes for lithium (Li) ion batteries, energy adsorbers, and the like.

FIG. 1 illustrates fabrication steps of an embodiment of a method for fabricating an alloy microstructure. More particularly, FIG. 1 illustrates a method for fabricating Al alloy microtube or microrod structure.

Figure 1A:
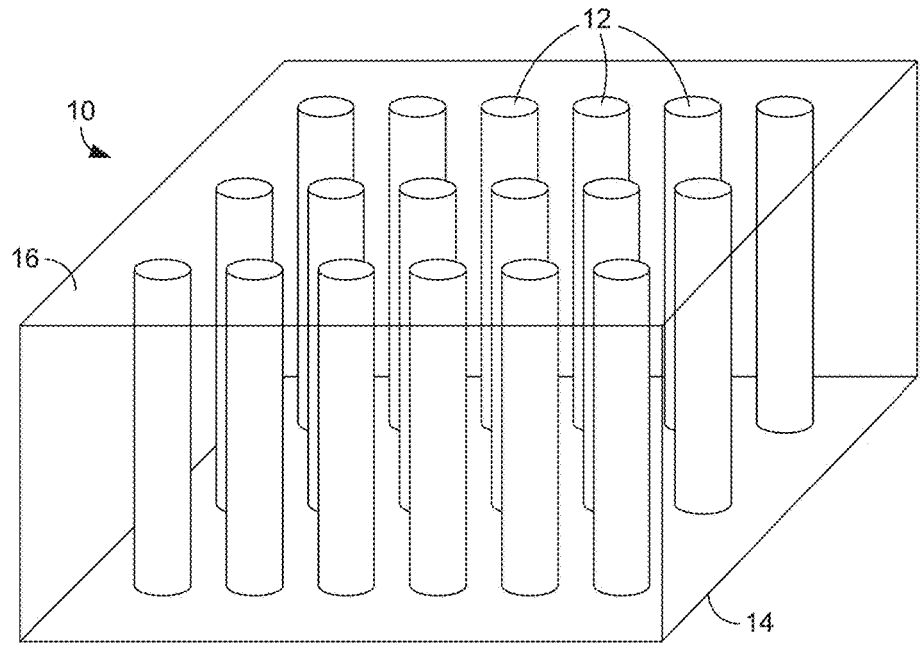
FIGS. 1A-1D are sequential images illustrating steps of a first embodiment of a method for fabricating a microstructure.

Beginning with FIG. 1A, a non-conductive polymer membrane 10 is formed that comprises a plurality of pores 12 that extend from a first or bottom end 14 of the membrane to a second or top end 16 of the membrane. In some embodiments, the membrane 10 is approximately 5 μm to 10 cm thick, in which case the pores 12 can also be approximately 5 μm to 10 cm long. In other embodiments, the thickness of the membrane 10 and the length of the pores 12 are approximately 10 to 30 μm. As shown in FIG. 1A, the pores 12 can be elongated, parallel, cylindrical pores that are arranged in an equally spaced, orthogonal grid pattern. In some embodiments, the pores 12 can have diameters of approximately 100 to 600 nm. It will be understood, however, that the pores 12 can have other configurations and dimensions, if desired. In some embodiments, the non-conductive polymer comprises polycarbonate. Polycarbonate is a suitable material for this application because it can be easily removed after the desired Al alloy structures have been formed, as described below.

Figure 1B:
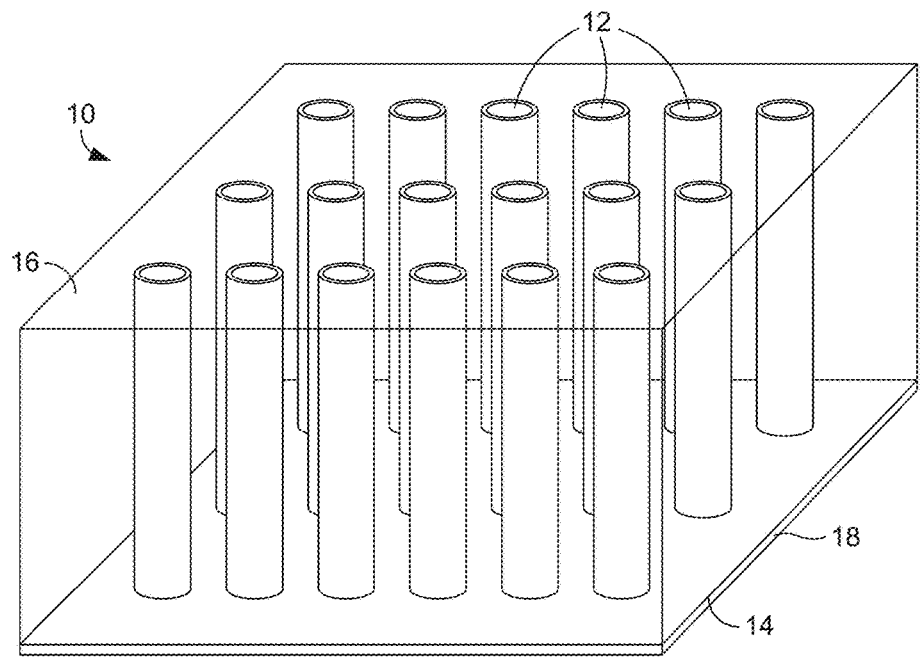

With reference to FIG. 1B, an end (the bottom end 14 in this example) of the membrane 10 is coated with a layer of conductive material so as to form a first or bottom layer 18 of conductive material. By way of example, the conductive material can be copper (Cu), which can be sputtered onto the membrane with a thickness of approximately 200 to 300 nm. Notably, the conductive material is deposited on not only the bottom end 14 of the membrane 10 but also on the inner surfaces of the pores 12 such that the Al alloy can be grown on both the bottom end and within the pores of the membrane.

Next, the Al alloy can be electrodeposited on the conductive material. In some embodiments, the Al alloy is deposited using a one-step, three-electrode galvanostatic electrodeposition process in which the coated membrane 10 acts as the cathode or working electrode in the process. The coated membrane 10 can be placed in a room temperature ionic liquid electrolyte that contains Al and the other metal to be deposited on the copper coating through electrodeposition. In some embodiments, the electrolyte comprises a solution of $AlCl_3$, 1-ethyl-3-methyl-imidazolium chloride (EMIC), and $MnCl_2$. As described below, the microstructure of the Al alloy to be formed can depend upon the concentration of the alloyed metal (e.g., Mn) within the electrolyte. In some embodiments, the Al alloy can have a crystalline microstructure. In other embodiments, the Al alloy can have an amorphous microstructure.

Figure 1C:
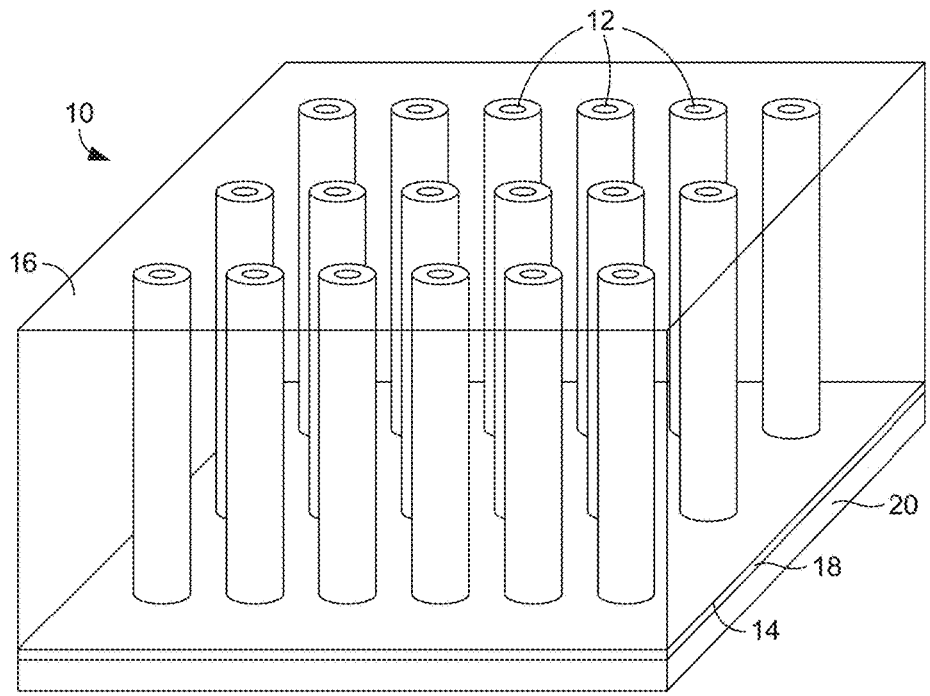

With reference next to FIG. 1C, as the Al alloy is deposited, if forms an end plate 20 at the bottom end 14 of the membrane 10 and fills the pores 12 of the membrane to create either microtubes or microrods. Whether microtubes or microrods are formed can depend upon various factors, such as the diameter of the pores 12, the current density used during electrodeposition, and the duration of the electrodeposition. In some embodiments, the electrodeposition can be performed at a cathodic current density of approximately 6 $mA/cm^2$ for approximately 3 to 10 minutes.

Figure 1D:
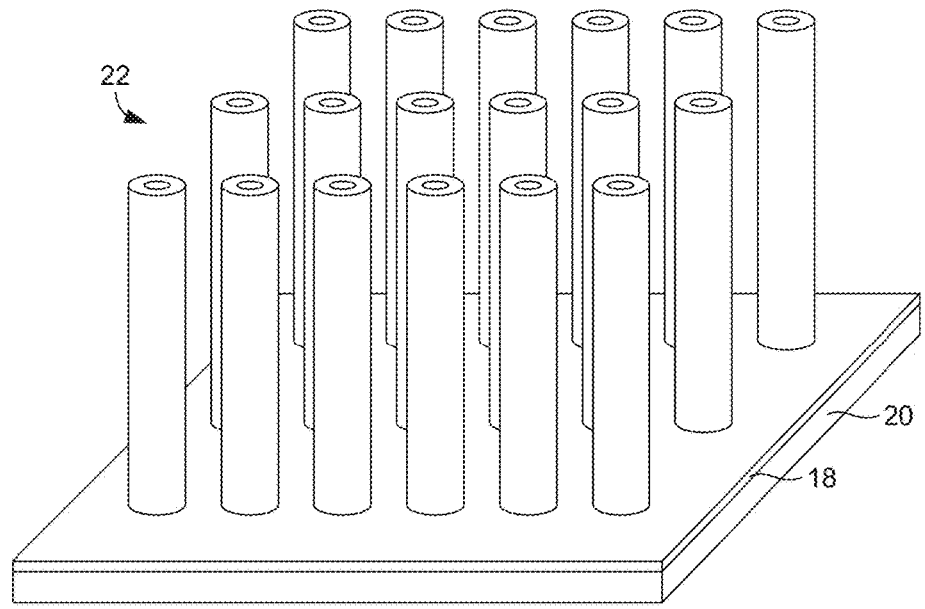

Irrespective of whether microtubes or microrods are formed, the non-conductive polymer of the membrane 10 can next be removed, as indicated in FIG. 1D, so as to obtain free-standing microtubes or microrods 22 (microtubes shown in FIG. 1D). In some embodiments, the polymer can be removed by dissolving it using dichloromethane. Once the polymer is removed, a microstructure results that has a bottom plate 20 and multiple microtubes/microrods 22 having free ends extending therefrom.

FIG. 2 illustrates fabrication steps of an embodiment of a method for fabricating a further type of an alloy microstructure. More particularly, FIG. 2 illustrates a method for fabricating Al alloy microsandwich structures. As used herein, the term "microsandwich structure" refers to a structure in which a core comprising one or more hollow tubes or solid rods are terminated at their opposite ends by end plates.

Figure 2A:
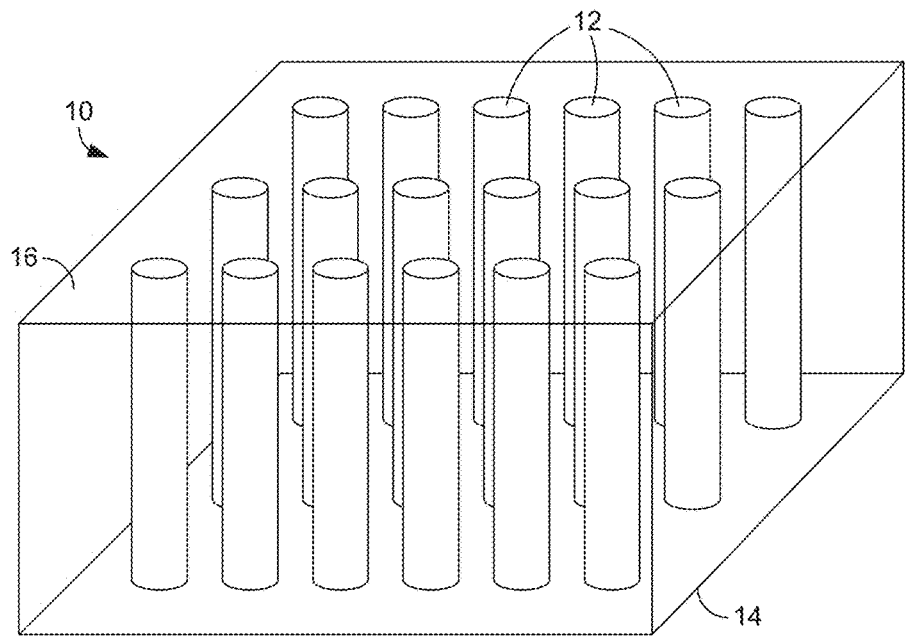
FIGS. 2A-2D are sequential images illustrating steps of a second embodiment of a method for fabricating a microstructure.

The process used to fabricate a microsandwich structure is similar to the process described above in relation to FIG. 1. Accordingly, as shown in FIG. 2A, a non-conductive polymer membrane 10 is formed that comprises a plurality of pores 12 that extend from a first or bottom end 14 of the membrane to a second or top end 16 of the membrane. The membrane 10 and pores 12 can have configurations and dimensions similar to those of the like-named features described above.

Figure 2B:
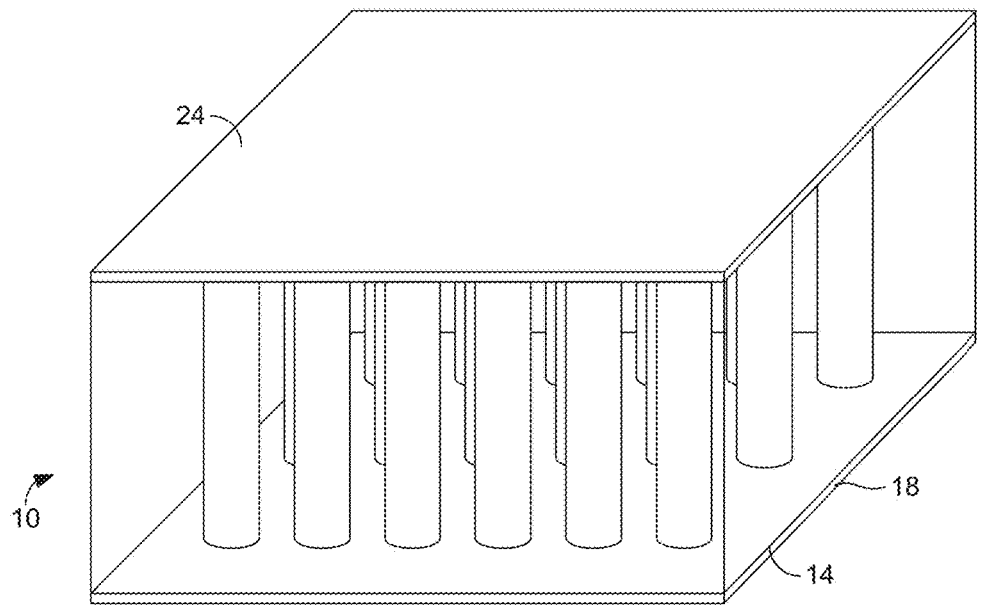

With reference to FIG. 2B, the membrane 10 is coated with a layer of conductive material, such as Cu, so as to form a first or bottom layer 18 and a second or top layer 24 of conductive material. As before, the conductive material is also deposited on the inner surfaces of the pores 12 such that the Al alloy can be grown on both the ends and within the pores of the membrane.

Figure 2C:
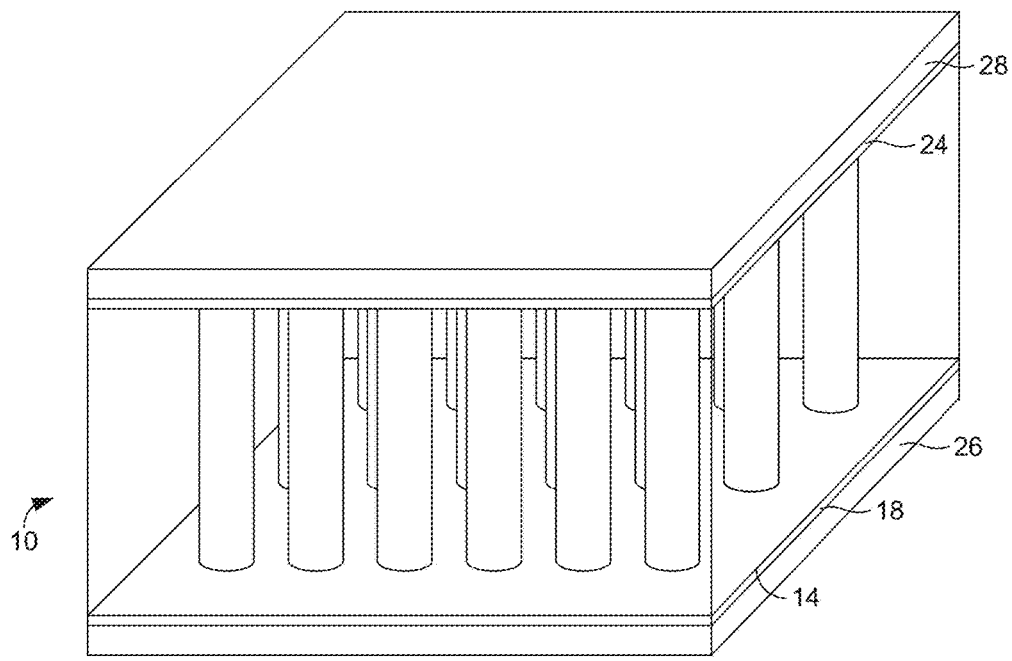

Next, referring to FIG. 2C, the Al alloy can be electrodeposited in similar manner to that described above in relation to FIG. 1. Through such electrodeposition, the Al alloy can form first and second, or bottom and top, end plates 26 and 28 over the bottom and top layers 18, 24 of conductive material and fill the pores 12 of the membrane to form pillars of the microsandwich structure. Whether the pillars will comprise microtubes or microrods can depend upon various factors, such as the diameter of the pores, the current density used during electrodeposition, and the duration of the electrodeposition.

Figure 2D:
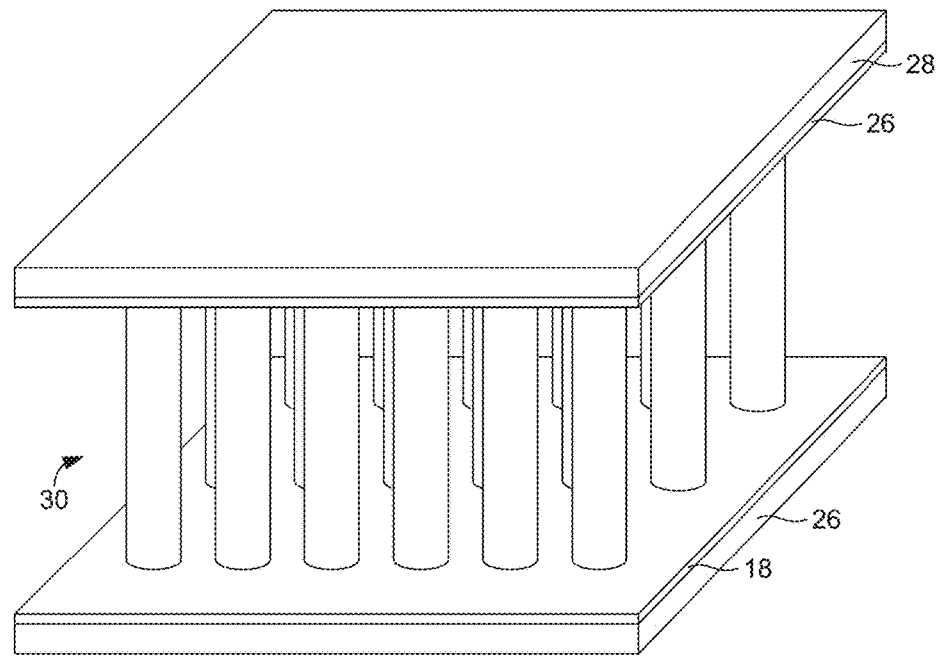

The non-conductive polymer of the membrane 10 can next be removed, as indicated in FIG. 2D, so as to form pillars 30 that extend between the end plates 26, 28. As shown in this figure, the pillars 30 can be equally spaced, cylindrical, and generally perpendicular to the bottom and top end plates 20, 24, which are generally parallel to each other. In some embodiments, the pillars 30 are hollow. In other embodiments, the pillars 30 are solid. Regardless, the pillars 30 are small in scale and, like the pores 12, can be approximately 5 μm to 10 cm long. In some embodiments, the pillars 30 have a microscale and are approximately 10 to 30 μm long.

Structures of the types described above were fabricated using the above-described methods. Track-etched polycarbonate membranes (Cyclopre) having average nominal pore diameters of 5 μm were sputtered (CRC sputter coater, 99.99% argon (Ar), 5 mTorr) with a Cu layer of approximately 250 nm thickness on both sides of the membrane prior to electrodeposition. The electrodeposition was performed at room temperature using a three-electrode setup inside an Ar-filled glovebox (Mbraun Labstar, $O_2$<1 ppm, $H_2O$<1 ppm). Al wire (99.99%, Alfa Aesar) was used as the reference electrode. The Cu-coated polycarbonate membranes (working electrodes) were placed in the middle of two parallel Al anodes (99.99%, Alfa Aesar), enabling Al-Mn to be deposited from both ends of the pores. The ionic liquid electrolyte was made by mixing $AlCl_3$ (anhydrous, 99.999%, Alfa Aesar) and EMIC (>98%, Iolitec) in 2:1 molar ratio. As-received EMIC was dried under vacuum at 60° C. for at least 24 hours prior to mixing. The electrolyte was then purified using Al plate under agitation until a vanish yellow color was achieved. $MnCl_2$ (98%, GFS Chemicals) was added to the electrolyte in different molarities and agitated for 24 hours. Galvanostatic electrodeposition was performed using Gamry Reference 600 potentiostat/galvanostat at 10 $mA/cm^2$ for 1 hour. Finally, free-standing microsandwich structures were obtained by dissolving the polycarbonate membrane using dichloromethane.

Cyclic voltammetry experiments were performed on a tungsten wire (~1 mm diameter) working electrode at a scan rate of 20 mV/s. The deposited structures were characterized using X-ray diffraction (XRD) (PANalytical X'Pert PRO), scanning electron microscopy (SEM) (Hitachi SU-70), and energy-dispersive X-ray spectroscopy (EDS) (EDAX-Phoenix). Cross-sections of the microsandwich structures were obtained by ion milling using focused ion beam microscopy (FIB) (FEI Quanta 200). Special care was taken to minimize gallium (Ga) contamination by using reduced current density during the final milling steps. Nanoindentation of the deposits was performed using a triboindenter (Hysitron, Ti900) with a diamond Berkovich tip (~125 nm radius) at a 7 mN maximum load, a 1.4 mN/s loading/unloading rate, and a 2 second holding time. Micro-indentation (UMT-2, CETR) tests were performed using an alumina ball (4 mm diameter) tip under a constant normal load (varied from 20 to 25 N).

Figure 3:
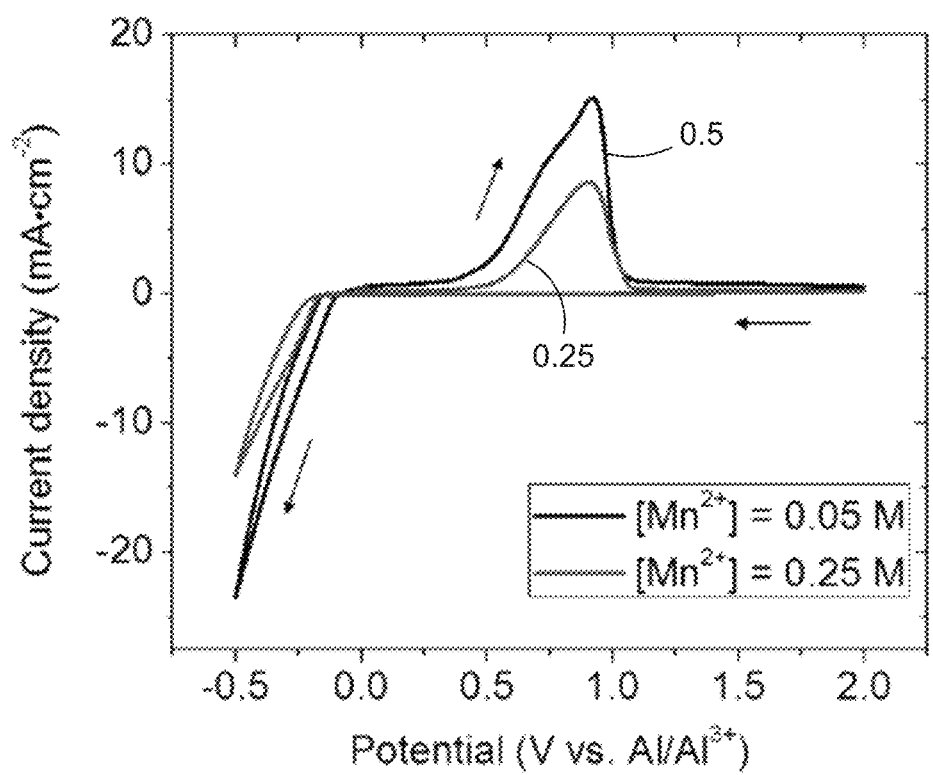
FIG. 3 is a graph that plots cyclic voltammograms recorded in an AlCl$_3$-EMIC electrolyte containing 0.5 and 0.25 M [Mn$^{2+}$].

FIG. 3 shows the typical cyclic voltammograms recorded at the working electrodes in 66.7-33.3 mol % $AlCl_3$-EMIC electrolyte containing 0.05 and 0.25 M [$Mn^{2+}$]. The scan started from 2 V versus $Al/Al^{3+}$ and was reversed at −0.5 V versus $Al/Al^{3+}$. Mn is nobler than Al in aqueous solution, but in acidic chloroaluminate electrolyte (with a molar fraction of $AlCl_3$>0.5), the deposition potential for Mn is slightly more negative than that for Al. The forward scan in FIG. 3 is similar to that reported for pure Al and therefore shows no obvious reduction wave associated with [$Mn^{2+}$]. This indicates that Mn co-deposited with Al at potentials lower than approximately 0.1 V versus $Al/Al^{3+}$ in the ionic liquid with 0.05 M [$Mn^{2+}$]. The overall reduction of Al-Mn occurred by the following reactions:

$$Mn^{2+}+2e^-\leftrightarrow Mn, \text{ and} \qquad (1)$$

$$4Al_2Cl_7^-+3e^-\leftrightarrow Al+7AlCl_4^- \qquad (2)$$

In the reverse scan, Al-Mn dissolution occurred at potentials higher than approximately 0.3 V versus $Al/Al^{3+}$. Increasing [$Mn^{2+}$] in the electrolyte shifted the reduction potential in the anodic direction and the dissolution potential in the cathodic direction. In addition, the current densities decreased by approximately 40% as [$Mn^{2+}$] increased from 0.05 to 0.25 M. This is similar to that reported by others, who found that the addition of [$Mn^{2+}$] inhibits the nucleation of Al. EDS (EDAX-Phoenix) analysis showed that increasing [$Mn^{2+}$] from 0.05 to 0.25 M increased the Mn concentration in the deposits from 9.0±0.3 at. % to 26.2±0.4 at. %. During co-deposition of Al and Mn, the alloy composition is mainly governed by the concentrations of the electroactive species $Al_2Cl_7^-$ and $Mn^{2+}$. [$Al_2Cl_7^-$] strongly depends on the acidity of the electrolyte. Under Lewis base conditions (molar fraction of $AlCl_3$<0.5), [$Al_2Cl_7^-$] is close to zero (<$10^{-7}$ M). Thus, maintaining a Lewis acid electrolyte is desirable for the deposition of an Al-Mn binary alloy. It should also be noted, however, that this condition is not necessary for Al-Mn deposition in inorganic chloroaluminate electrolyte systems in which the deposition can take place involving the discharge of $Al_2Cl_4^-$ in basic solution.

Figure 4A:
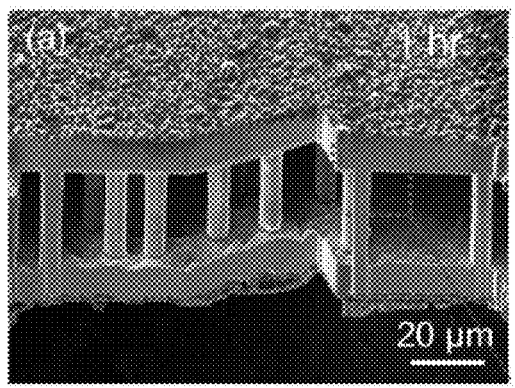
FIGS. 4A-4D are scanning electron microscope (SEM) images of a microsandwich structure (4A and 4B) and microtube structure (4C and 4D) electrodeposited using an AlCl$_3$-EMIC electrolyte containing 0.5 [Mn$^{2+}$].
Figure 4B:
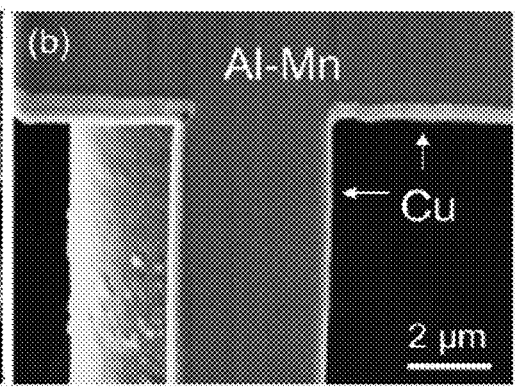
Figure 4C:
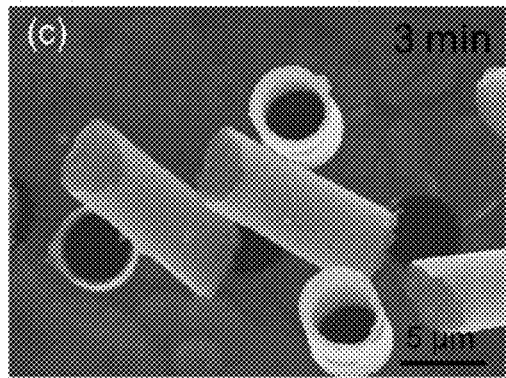

Al-Mn microsandwich structures were successfully electrodeposited from acidic $AlCl_3$-EMIC-$MnCl_2$ electrolyte contains 0.05 M [$Mn^{2+}$] following the procedures described above in relation to FIG. 2. Galvanostatic control was chosen to better control the size of the deposited structures. FIG. 4A shows a SEM image of the microsandwich structure having approximately 11 µm thick end plates separated by 27.6±0.6 µm tall pillars, which resembles the ancient Temple of Athena Nike. FIG. 4B shows a partial cross-section of the microsandwich structure. Both the Cu coating (light contrast) and the Al-Mn pillar (dark contrast) can be seen clearly in this figure. In this example, the pillars were formed as solid rods.

Figure 4D:
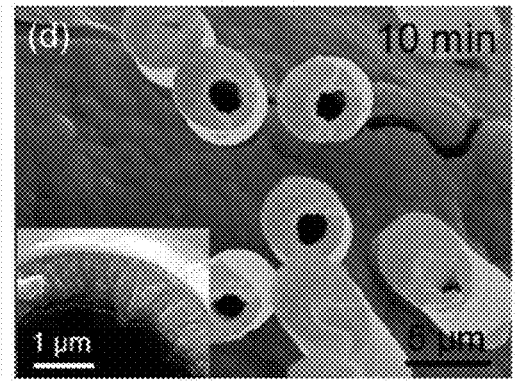

To evaluate the microsandwich growth kinetics, selected electrodeposition was carried out for 3 and 10 minutes using one Al plate as an anode. The deposited microstructures were free standing microtubes having various wall thicknesses. Typical SEM images of the microtubes are shown in FIGS. 3C and 3D. The microtubes were hollow and had an average height of 9.8±0.9 µm. Increasing the deposition time from 3 to 10 min lead to thickening of the tube walls from 670±100 nm to 1.2±0.4 µm without affecting the tube length. The inset in FIG. 4D shows a close-up of a microtube after 10 minutes of deposition. It can be seen that the deposition advanced in the radial direction of the pore and the inner microtube surface roughness increased with deposition time. During electrodeposition, kinetic roughening is often observed following a power law $<w>\propto t^\beta$, where w represents the surface width, i.e., the average edge length projected on the substrate, and t is the deposition time. The power exponent β typically varies from 0.2 to 0.5, depending on deposition parameters such as the current density and electrolyte concentration. Measurements of the inner microtube surfaces indicate an approximate 36% increase of the surface width as the deposition time increased from 3 to 10 minutes, yielding a power exponent β≈0.25.

Figure 5:
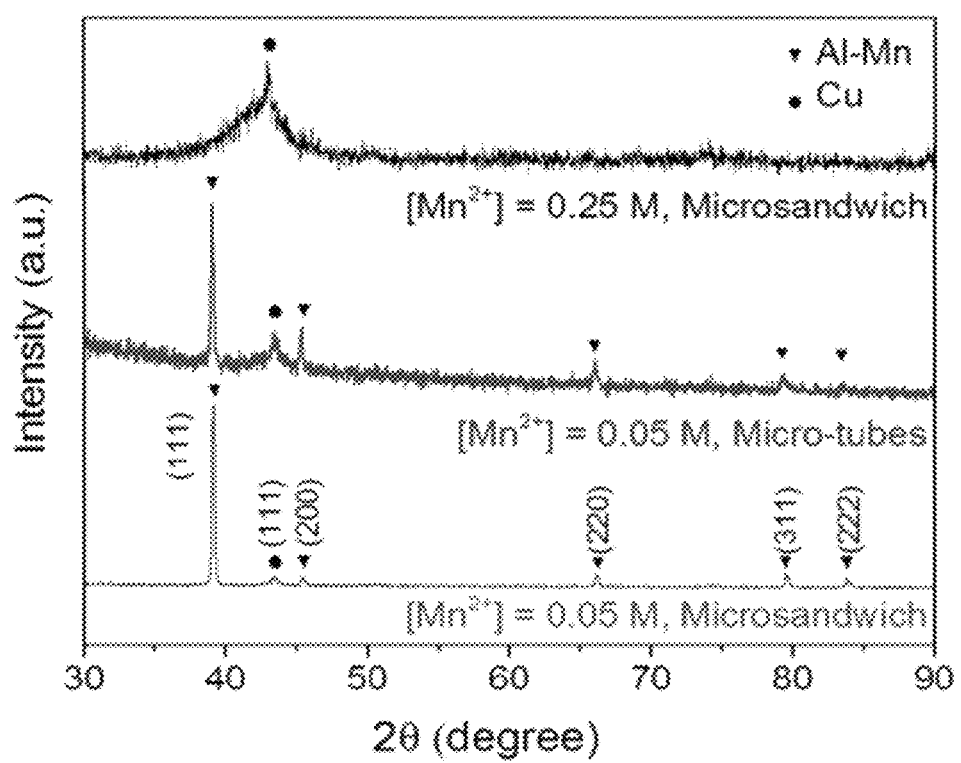
FIG. 5 is a graph that plots x-ray diffraction (XRD) 2θ scans of microtube and microsandwich structures.

XRD results of the microtube and microsandwich structures are presented in FIG. 5. At 0.05 M [$Mn^{2+}$], the XRD pattern of the microtube and microsandwich structures exhibited a single set of fcc peaks (lattice constant≈4.00 Å) in addition to Cu (111), indicating the formation of a superstaturated solid solution of Al-Mn. This Mn concentration (9.0 at. %) is significantly higher than the equilibrium solubility of Mn in Al at room temperature (~0.62 at. %). For the microsandwich structure, a pronounced <111> fiber texture developed along the pillar direction, similar to that observed in other fcc metallic nanowires. At 0.25 M [$Mn^{2+}$], the XRD pattern of the microsandwich structure indicates the formation of a complete amorphous phase (with possible local ordering), as represented by the diffuse peak at 2θ≈42°. These results indicate that Mn, which has a Goldschmidt radius approximately 11% smaller than Al, is substitutionally incorporated into the Al lattice. Further increasing alloy content frustrates the ordered structure and leads to the formation of amorphous phase.

The hardness of the crystalline (Al-9 at. % Mn) and amorphous (Al-26 at. % Mn) deposits was 2.59±0.21 GPa and 6.14±0.35 GPa respectively, obtained using Oliver-Pharr method. Given the low density of Al alloys ($\rho_{Al-9Mn}$≈3.12 g/cm$^3$ and $\rho_{Al-26Mn}$≈3.94 g/cm$^3$) and the open architecture, the density of the microsandwich structures is estimated to be approximately 1.50 g/cm$^3$ (relative density ρ=0.48) and 1.89 g/cm$^3$ (relative density ρ=0.48) for the crystalline and amorphous structure respectively. The estimated specific strengths of the microsandwiches were between 277 and 520 kN·m/kg, which is well in excess of most commercial engineering alloys such as steel (130 kN·m/kg) and Ti-6Al-4V (240 kN·m/kg).

Figure 6A:
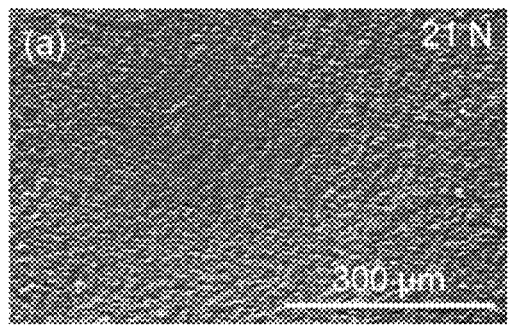
FIGS. 6A-6F are SEM images of a surface (6A and 6B) and cross-section (6C and 6D) of Al-9 at. % Mn and Al-26 at. % Mn pillars after microindentation, and structural failure of the microsandwich structure (6E and 6F).
Figure 6B:
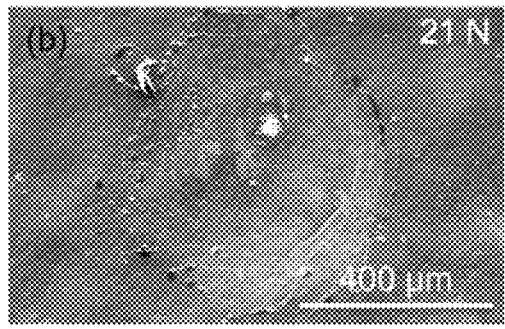
Figure 6C:
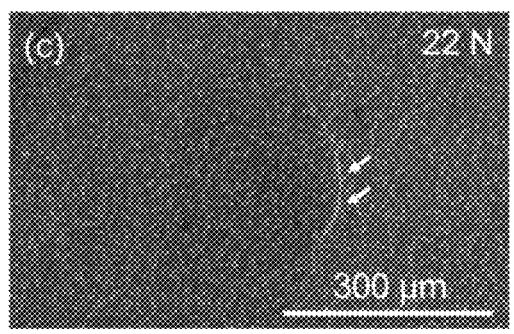
Figure 6D:
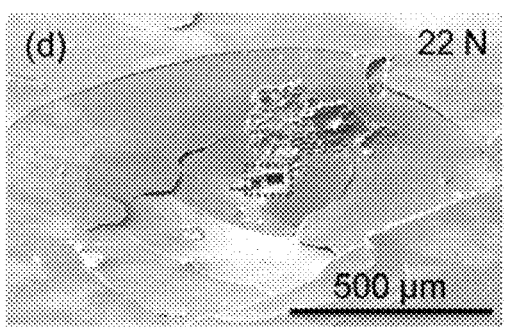
Figure 6E:
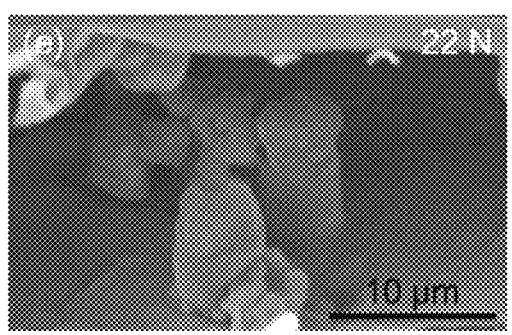
Figure 6F:
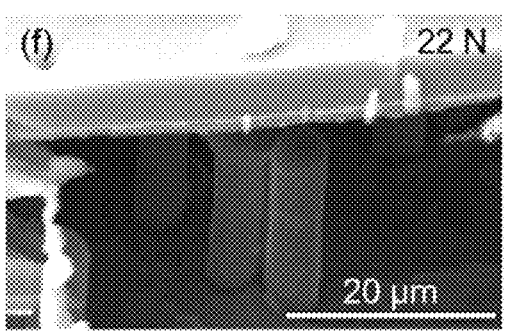

A preliminary study was performed to evaluate the impact damage resistance of the microsandwich structures under a 20 to 25 N normal load. It was observed that top plate cracks began to develop in the crystalline microsandwich at loads larger than approximately 22 N. On the other hand, large scale cracks were observed on the top plates of the amorphous microsandwich structures under all investigated loads. FIGS. 5A-D show typical SEM images of the surface of the microsandwich structures indented with forces of 21 and 22 N. The failure modes were similar to those reported for macroscale sandwich structures. The crystalline microsandwich structures mainly failed by pillar compression (see FIG. 6E) with minimal deformation of the top plate. The height of the deformed pillars beneath the indent was approximately 8.3±0.5 µm, corresponding to a local compressive strain of approximately 70%. An arc-shaped crack was developed near the edge of the contact area under 22 N (see FIG. 6A), characteristic of ductile intergranular fracture. The failure mode of the amorphous microsandwich structure (see FIGS. 6B and 6D) was mainly the brittle fracture and collapse of the top plate, while the pillars underneath retained their original shapes (see FIG. 6F). Debonding between the top plates and the cores was observed in both samples.

During indentation of a microsandwich structure, the core yield load ($P^1$) can be estimated as $$P_1 = 1.52\sigma_c bt\left(\frac{E_c}{E_f}\frac{c}{t}\right)1/4 \quad (3)$$

where the core yield strength ($\sigma_c$, listed in Table 1) is calculated from nanoindentation hardness assuming a Tabor factor of three, the plate thickness t is 11 μm, the sample width b is 1 mm, the core thickness c is 27.6 μm, and the core-to-end plate elastic modulus ratio is approximately 1. The load for top plate fracture ($P_2$) and the plastic zone size (2s, as defined in FIG. 4) can be solved numerically from Equations (4) and (5):

$$\left(\frac{3\lambda}{2\sigma_c b}\right)P_2 = \frac{(2z^2-1)-6z}{z^2(\sinh^2 z' + \sin^2 z') + 2z(\sinh z'\cosh z' - \sin z'\cos z') - (\cosh^2 z' + \cos^2 z')} \quad (4)$$

and $$\left(\frac{\lambda}{\sigma_c b}\right)P_2 = \frac{\frac{\lambda^2 t_f^2 \sigma}{3\sigma c} + z^2 + 2zA + B}{z + A} \quad (5)$$

Where $$z = \lambda s,\ z' = \lambda s',\ \lambda = \left(\frac{3E_f}{E_c^3 ct}\right)1/4,\ A = \frac{\sinh z'\cosh z' - \sin z'\cos z'}{\sinh^2 z' + \sin^2 z'}$$

and $$B = \frac{\sinh^2 z' - \sin^2 z'}{\sinh^2 z' + \sin^2 z'}.$$

The calculated results are listed in Table 1. For the crystalline microsandwich structure, the predicted plate fracture load was 23.4 N, which is close to the crack initiation load measured experimentally (~22 N). This load was also larger than the core yield load (18.2 N). Thus, extensive core compression occurred prior to plate crack formation. In addition, the predicted plastic zone size (300 μm) agrees well with the experimentally measured fracture size (dashed arc in FIG. 6C). For the amorphous microsandwich structure, the predicted core yield load (43.1 N) was much higher plate the applied loads. Thus, no core compression was expected in this case. On the other hand, the brittle fracture of the top plate, in spite of a high plate fracture load (55.6 N), was likely related to the near-zero tensile ductility of amorphous metals, which lacks sufficient intrinsic micro-mechanisms to mitigate high stress concentrations at crack tips.

TABLE 1

| Micro-sandwich composition | Elastic modulus (GPa) | Poisson's ratio | Yield strength (MPa) | Plastic zone size (μm) | Core yield load (N) | Skin fracture load (N) |
|---|---|---|---|---|---|---|
| Al-9 at. % Mn | 81.5 | 0.301 | 863 | 300 | 18.2 | 23.4 |
| Al-26 at. % Mn | 103 | 0.318 | 2,050 | 300 | 43.1 | 55.6 |

Figure 7A:
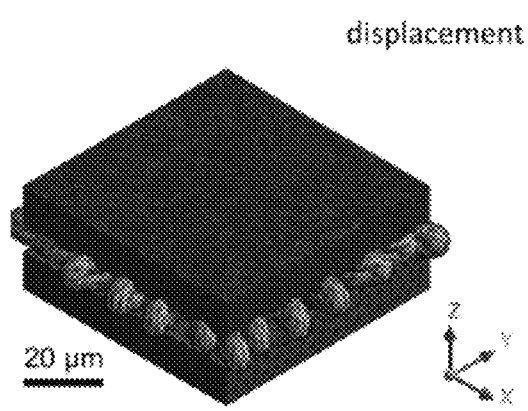
FIGS. 7A-7D are renderings of finite element analysis (FEA) predicted displacement (7A and 7B) and equivalent stress (7C and 7D) of Al-9 at. % Mn and Al-26 at. % Mn pillars after microindentation.
Figure 7B:
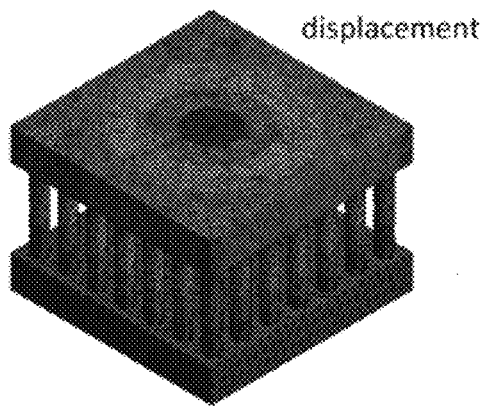
Figure 7C:
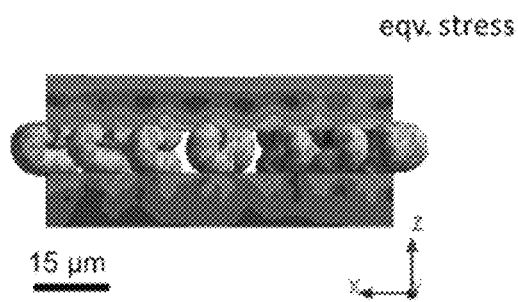
Figure 7D:
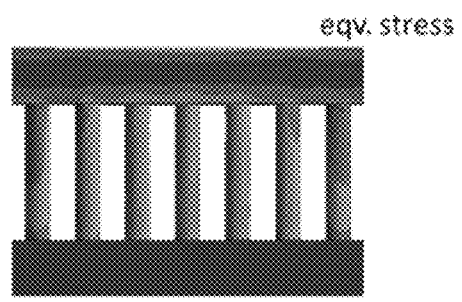

To gain a further understanding of the failure mechanism of the microsandwich structures, finite element analysis (FEA) was performed using Ansys Workbench over an area of 70×70 μm² with pillars separated 10 μm apart. The dimensions of the microsandwich structure were taken from experimental measurements. Both Al-9 at. % Mn and Al-26 at. % Mn were assumed to be elastic-perfectly plastic with material properties listed in Table 1. The microsandwich structures were loaded at 0.81 N and subsequently unloaded to reproduce the experimentally measured displacement. The FEA results are shown in FIGS. 7A-7D. Under the same load, the crystalline microsandwich structures were plastically deformed with large displacement (see FIG. 7A), while the amorphous microsandwich structure only experienced elastic deformation (mainly on top plate, as shown in FIG. 7B). In both cases, the maximum equivalent stress and the critical shear strains always appeared near the end plate-core interface, in agreement with the pillar delamination location observed experimentally. The absorption energy per unit volume of the crystalline microsandwich structure was estimated to be approximately 43.2 MJ/m³, which was much higher than that of conventional aluminum foams under similar strain (e.g., ~1-4 MJ/m³ for ALPORAS).

From the foregoing disclosure, it can be appreciated that the crystallinity of the electrodeposited Al—Mn alloys of a microstructure can be tuned by controlling [$Mn^{2+}$] in the electrolyte. Microsandwich pillars were found to grow along the radial direction of the template pores with tunable wall thickness by the deposition time. Given the flexibility and scalability of the electrodeposition process, the methods described herein present an interesting future direction for designing ultra-lightweight energy adsorbers with open architecture, high strength, and high damage resistance.

The invention claimed is:

1. An alloy microstructure comprising:
    a bottom plate made of an aluminum alloy; and
    a plurality of elongated pillars that extend from the bottom plate, the pillars being made of the aluminum alloy and having lengths no greater than 10 centimeters;
    wherein the aluminum alloy is an alloy of aluminum and manganese.

2. The alloy microstructure of claim 1, wherein the aluminum alloy has a crystalline microstructure.

3. The alloy microstructure of claim 1, wherein the aluminum alloy has an amorphous microstructure.

4. The alloy microstructure of claim 1, wherein the bottom plate is planar.

5. The alloy microstructure of claim 1, wherein the elongated pillars are generally parallel to each other and perpendicular to the bottom plate.

6. The alloy microstructure of claim 1, wherein the elongated pillars are arranged in an equally spaced, orthogonal grid pattern.

7. The alloy microstructure of claim 1, wherein the elongated pillars are hollow.

8. The alloy microstructure of claim 1, wherein the elongated pillars are solid.

9. The alloy microstructure of claim 1, wherein the elongated pillars are approximately 10 to 30 microns long.

10. The alloy microstructure of claim 1, wherein the elongated pillars have a cross-sectional dimension of approximately 100 to 600 nanometers.

11. The alloy microstructure of claim 1, further comprising a top plate made of the aluminum alloy, wherein the elongated pillars extend between the top and bottom plates.

12. The alloy microstructure of claim 11, wherein the elongated pillars are generally perpendicular to the top plate.

* * * * *